Jan. 29, 1946.   D. W. KELBEL   2,393,693
ONE-WAY COUPLING DEVICE
Filed May 3, 1944
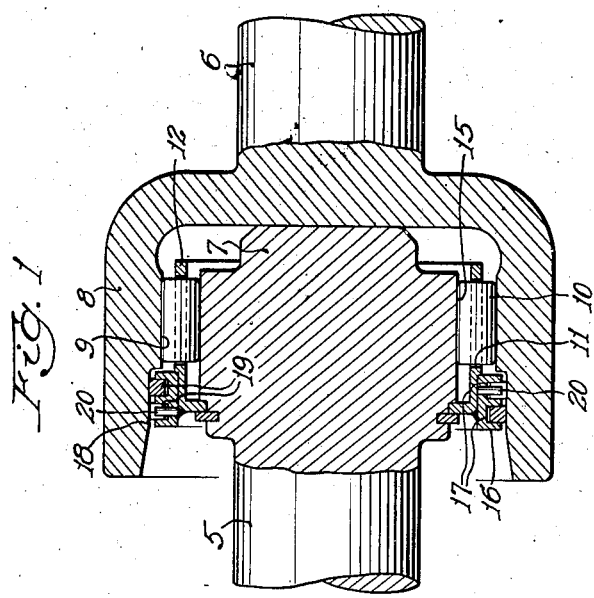
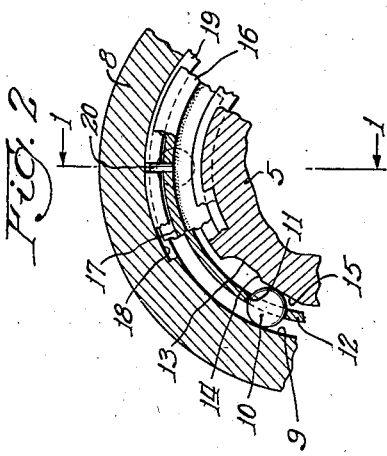
Inventor:
Donald W. Kelbel
By Edward L. Fitzhugh
Atty.

Patented Jan. 29, 1946

2,393,693

UNITED STATES PATENT OFFICE 2,393,693

ONE-WAY COUPLING DEVICE

Donald W. Kelbel, Muncie, Ind., assignor to Borg-Warner Corporation, Chicago, Ill., a corporation of Illinois Application May 3, 1944, Serial No. 533,988

5 Claims. (Cl. 192—45)

This invention relates to a one-way coupling assembly, and it has particular reference to a device that is adapted to effect a one-way clutching or braking action between two relatively movable members such as the driving and driven shafts of motor vehicles. The improvements also are directed to means for controlling such one-way clutch or brake.

It is one of the principal objects of this invention to simplify the construction of a one-way coupling such as contemplated herein, and to improve the efficiency, operation and dependability of such one-way coupling.

It is also a principal object of this invention to provide instrumentalities that will eliminate wear and the noise of the rollers that is usually due to the spinning of the rollers during the over-running operation of the coupling. This is accomplished by creating a drag through the medium of friction members to retract the rollers out of operative relation to the cams, thus eliminating the use of springs for controlling the one-way clutch or coupling.

Another object of the present invention is to effect the free-wheeling or over-running operation of a one-way clutch or coupling by means of a frictional member that is adapted to maintain the rollers in inoperative positions during such over-running operation. In this connection, the frictional member is a positively operating ring or rings that operate to exert a drag upon the rollers thereby to maintain them in positions where they are ineffective upon the cams with which they are adapted to cooperate when coupling the driving member and the driven member together.

A further object hereof resides in providing one or more friction rings on the roller cage, and to position such ring or rings in a manner to bear against a race for the rollers on a portion of a shaft.

Still another object embodies the provision of a suitable carrier on the roller cage, said carrier having means for seating one or more rings in frictional contact with a race member. Conceivably said carrier may be fabricated as an integral part of the cage or the cage itself my be of split ring construction. Furthermore, the friction ring structure of the assembly may be arranged to engage either the inner or outer race for the rollers.

Additional objects, aims and advantages of the invention contemplated herein will be apparent to persons skilled in the art after the construction and operation of the one-way coupling device is understood from the within description.

It is preferred to accomplish the numerous objects of this invention and to practice the same in substantially the manner hereinafter fully described and as more particularly pointed out in the appended claims, reference being made to the accompanying drawing that forms a part of this specification.

In the drawing:

Fig. 1 is an enlarged detailed section taken axially through an assembly that embodies the instrumentalities of this invention, the view being on the plane of line 1—1 on Fig. 2.

Fig. 2 is a fragmentary elevation looking at the left side of the structure shown in Fig. 1.

The drawing is to be understood as being more or less of a schematic character for the purpose of disclosing a typical or preferred form of the improvements contemplated herein, and in this drawing like reference characters identify the same parts in the different views.

Referring particularly to Fig. 1, the assembly comprises the drive member 5 and the driven member 6, preferably arranged in axial alinement in the manner of the driving and driven shafts of a motor vehicle, marine vessel, aircraft, and the like. The drive member or shaft 5 is provided with an enlargement or head 7 at its end that is surrounded by the cylindrical cup-shaped end portion 8 of the driven member 6. The end portion 8 has a smooth cylindrical inner surface 9 that provides the outer race for a plurality of rollers 10 retained in spaced recesses 11 in the annular roller cage 12.

The outer surface of the enlargement or head 7 of drive member 5 is provided with recesses or depressions 13 that are connected by short ramps 14 to the cam surfaces 15 having inclination outwardly toward the cylindrical race surface 9 of the cup-shaped end 8 of driven member 6. The rollers 10 are interposed between the cylindrical race 9 and the recessed and cammed faces just mentioned. The control means for the rollers 10 comprise an annular carrier 16 that is suitably secured to or made integrally with the cage 11, and has one or more circumferential grooves 17 in its outer face which confronts a cylindrical friction surface 18 alongside or a part of the race 9 on the interior of the cup-shaped end of the driven member 6. These grooves 17 have radially yieldable split friction rings 19, preferably of rectangular section, seated in them in a manner to dispose the outer faces of said rings in frictional contact with the friction surface 18 alongside or a part of the race 9. Said rings are prevented from rotating relative to carrier 16 by pins 20 that are forced into the carrier 16 between the split ends of each ring. Thus the friction between the outer surfaces of the rings and the surface 18 is effective to exert a drag on the carrier 16 and its associated roller and cage assembly.

When the direction of rotation is that in which the driving and driven members are coupled, the rollers 10 will ride up the cams 15 and lock the respective members for simultaneous rotation. Upon a deceleration of speed of rotation, or upon reversed rotation, the frictional force exerted by the rings 19 will cause a drag to be exerted upon the cage 12 that will shift the rollers off the cams and maintain them in inoperative positions in the recesses 13 to permit the over-running or free-wheeling of the assembly.

Thus a frictional force is developed by a radially expansible ring and transmitted to the rollers by a rigid connection to control the position of the rollers relative to the cams. The usual spring for continuously urging the rollers upon the cams has been supplanted by a frictional mechanism which prevents continued contact of the rollers with the overrunning member of the clutch during free-wheeling action.

While this invention has been described in detail in its present preferred form or embodiment, it will be apparent to persons skilled in the art, after understanding the construction and operation of the improvements, that various changes and modifications may be made therein without departing from the spirit or scope thereof. It is aimed in the appended claims to cover all such changes and modifications.

I claim:

1. A one-way coupling device comprising a drive member; a driven member; and a clutch interposed between said members, said clutch comprising a plurality of rollers; a cage for said rollers; a cylindrical race on one of said members; a confronting second race on the other member; a plurality of cam-surfaces on said second race, each cam-surface having a roller-receiving depression at one end; and radially yieldable friction means effective to exert a drag between said cage and said driver member.

2. A one-way coupling device comprising a drive member; a driven member; and a clutch interposed between said members, said clutch comprising a plurality of rollers; a cage for said rollers; a cylindrical race on said driven member; a confronting race on the drive member; a plurality of cam-surfaces on said drive member race, each cam-surface having a roller-receiving depression at one end; and radially yieldable friction means effective to exert a drag between said cage and said driven member.

3. A one-way coupling comprising a rotatable drive member; a rotatable driven member adapted to be coupled thereto; and a clutch interposed between said members, said clutch comprising a plurality of rollers; a cage for said rollers; carrier means on said cage; a cylindrical race on one of said members; a confronting race on the other member; a plurality of cam-surfaces on the last-mentioned race, each cam-surface having a roller-receiving depression at one end; and a radially yieldable friction ring coacting with said carrier means and with said driven member and effective to exert a drag therebetween upon a change of rotational speed between said members, thereby to move said rollers out of cooperation with said cam-surfaces and position said rollers in said depressions.

4. A one-way coupling comprising a rotatable drive shaft; a rotatable driven shaft adapted to be coupled thereto; and a clutch interposed between said shafts, said clutch comprising a plurality of rollers; a cage spacing said rollers; carrier means on said cage; a hollow cylindrical enlargement on said driven shaft overlying the adjacent end of the drive shaft; an internal race in said enlargement; a confronting race on the adjacent end of said drive shaft; a plurality of cam-surfaces on the last-named race adapted to wedge said rollers against said internal race to couple said shafts, said cam surfaces each having a roller-receiving depression at one end; and a radially yieldable friction ring maintained against rotational movement with respect to said cage, said friction ring coacting with said carrier means and with said driven shaft and effective to exert a drag therebetween upon a change of relative rotation between said shafts, thereby to move said rollers out of cooperation with said cam-surfaces and position said rollers in said depressions.

5. A one-way coupling comprising a rotatable drive shaft; a rotatable driven shaft adapted to be coupled thereto; and a clutch interposed between said shafts, said clutch comprising a plurality of rollers, a cage spacing said rollers, carrier means on said cage, a groove in said carrier means, a hollow cylindrical enlargement on said driven shaft overlying the adjacent end of the drive shaft, an internal race in said enlargement and a cylindrical surface alongside said race, a confronting race on the adjacent end of said drive shaft, a plurality of cam surfaces on the last named race adapted to wedge said rollers against said internal race to couple said shafts, said cam surfaces each having a roller-receiving depression at one end, and a radially yieldable friction ring positioned in the groove of the carrier means and maintained against rotational movement with respect to said cage, said friction ring coacting with said carrier means and with said cylindrical surface of said driven shaft and effective to exert a drag therebetween upon a change of relative rotation between said shafts, thereby to move said rollers out of cooperation with said cam surfaces and to position said rollers in said depressions.

DONALD W. KELBEL.